United States Patent
Wanat

(10) Patent No.: US 6,854,380 B2
(45) Date of Patent: Feb. 15, 2005

(54) TOASTER OVEN WITH AN IMPROVED TRAY TO FACILITATE REMOVAL OF BREADCRUMBS

(75) Inventor: David J. Wanat, Merdien, CT (US)

(73) Assignee: Conair Corporation, Stamford, CT (US)

(*) Notice: Subject to any disclaimer, the term of this patent is extended or adjusted under 35 U.S.C. 154(b) by 0 days.

(21) Appl. No.: 10/425,026

(22) Filed: Apr. 28, 2003

(65) Prior Publication Data
US 2004/0211324 A1 Oct. 28, 2004

(51) Int. Cl.⁷ ................................................. A47J 37/08
(52) U.S. Cl. ........................... 99/400; 99/389; 99/446
(58) Field of Search ........................ 99/400, 446, 385, 99/388, 389, 391

(56) References Cited

U.S. PATENT DOCUMENTS

| | | | |
|---|---|---|---|
| D282,045 S | 1/1986 | Pratt | D7/390 |
| 5,024,474 A | 6/1991 | Selby, III | 292/252 |
| D329,571 S | 9/1992 | Fehon | D7/390 |
| 5,218,592 A | 6/1993 | Isshiki et al. | 369/75.2 |
| 5,542,346 A | 8/1996 | Shenk | 99/400 |
| 5,735,191 A * | 4/1998 | Russell et al. | 99/339 |
| 6,186,054 B1 * | 2/2001 | Hung | 99/339 |
| 6,244,166 B1 * | 6/2001 | Lebron | 99/342 |
| 6,444,954 B1 | 9/2002 | Blankenship | 219/391 |

FOREIGN PATENT DOCUMENTS

GB    2117627    * 10/1983    ................. 99/400

OTHER PUBLICATIONS

Toasters, The Inside Story, article, pp. 1–7, 1998, vol. 2, No. 2 of Hotwire Newsletter.

* cited by examiner

Primary Examiner—Reginald L. Alexander
(74) Attorney, Agent, or Firm—Ohlandt, Greeley, Ruggiero & Perle, LLP

(57) ABSTRACT

A toaster has a housing with one or more bread receiving holes and an aperture. One or more bread carriages are positioned in the one or more bread receiving holes. The toaster has a first tray positionable in the aperture. The first tray has a first crumb collecting position and a second crumb removing position. The first tray also has a trough. A second removable tray is positionable in the trough.

20 Claims, 11 Drawing Sheets

TOASTER OVEN WITH AN IMPROVED TRAY TO FACILITATE REMOVAL OF BREADCRUMBS

BACKGROUND OF THE INVENTION

1. Field of the Invention

The present invention relates to an oven for toasting bread products. More particularly, the present invention relates to a toaster oven having a crumb tray that facilitates the collection and the removal of breadcrumbs in the toaster oven.

2. Description of the Related Art

Toaster units that employ crumb tray members to accumulate and remove breadcrumbs for minimizing the risk of a fire hazard are known in the art. Various types of crumb tray members for toasters are known in the art.

U.S. Pat. No. 5,542,346 to Shenk describes a toaster having a crumb collection tray. The crumb collection tray has external wheels, a foot and a handle. The toaster disclosed in Shenk has a trap door and rests on the crumb collection tray. The external wheels are for directional movement of the crumb collection tray. The user lifts the toaster resting on the crumb collection tray and uses the handle to steer the crumb collection tray using the external wheels. When the toaster is positioned over the crumb collection tray, the user will toggle the trap door on the toaster and empty the breadcrumbs into the crumb collection tray for subsequent removal to a waste paper basket. Thereafter, the user will close the trap door, then replace the toaster on top of the crumb collection tray.

This cited crumb collection tray is deficient in its operation. It is limited to users that are able to lift the toaster, a heavy and blunt object, from the crumb collection tray, and then subsequently lift the toaster a second time to replace the toaster on the crumb collection tray. This manner of operation may not be conducive to the elderly, the handicapped or individuals that are incapable of lifting a heavy and bulky object such as the toaster. Furthermore, there is a risk that the user will drop the lifted toaster.

Additionally, lifting the toaster and manipulating it in order to remove breadcrumbs may result in the breadcrumbs scattering further into the toaster. This will lead to the breadcrumbs being caught in the toaster and actually increase a risk of fire hazard, and pest and rodent infestation.

U.S. Des. Pat. No. 329,571 illustrates an electric toaster base with a crumb tray. The toaster base has the crumb tray disposed on a bottom side thereof. A detent secures the crumb tray to the toaster. To remove and empty the toaster crumb tray, the user must lift the toaster, toggle the detent and then shake and empty the crumb tray, preferably over a waster paper basket.

Again, this manner of operation may not be convenient or conducive to the individuals that are not capable of lifting a heavy and bulky object, especially in the instance where the user must both lift and manipulate a detent on the bottom side of the toaster. Also, by manipulating toaster, the breadcrumbs that are loosely aggregated therein may scatter into the toaster, thereby increasing pest infestation and increasing the potential risk of fire hazard, rather than decreasing these concerns.

It is desired to provide a toaster having a crumb tray assembly that requires a minimum amount of lifting to empty the crumb tray. It is also desired to provide such a toaster having a crumb tray assembly that decreases risk of fire and a risk of pest and rodent infestation.

SUMMARY OF THE INVENTION

It is an object of the present invention to provide a toaster oven that has a crumb tray assembly that minimizes a risk of fire hazard and the potential risk of rodent or pest infestation.

It is another object of the present invention to provide a toaster oven that has the crumb tray assembly with a first tray and a second tray.

It is a further object of the present invention to provide a toaster oven that has the second tray that is removable from the first tray such that the user does not have to lift the toaster oven to empty the second tray.

The present invention is a toaster having a housing with one or more bread receiving holes, an aperture, and one or more bread carriages in the bread receiving holes. The toaster also has a first tray or element positionable in the aperture. The first tray has a first crumb collecting position and a second crumb removing position. A device for biasing the first tray permits the first tray to be selectively manipulated from the first crumb collecting position to the second crumb removing position. A second removable tray, or element having a handle may be placed in a trough of the first tray. A user may empty breadcrumbs that aggregate on the second tray by lifting the second tray and emptying the second removable tray in, for example, a waste paper basket.

The above and other objects, advantages and benefits of the present invention will be understood by reference to the detailed description provided below and the accompanying drawings.

BRIEF DESCRIPTION OF THE DRAWINGS

The present invention will be better understood with reference to the following detailed description of the present teachings when viewed in conjunction with the accompanying drawings.

DETAILED DESCRIPTION OF THE INVENTION

Figure 1:
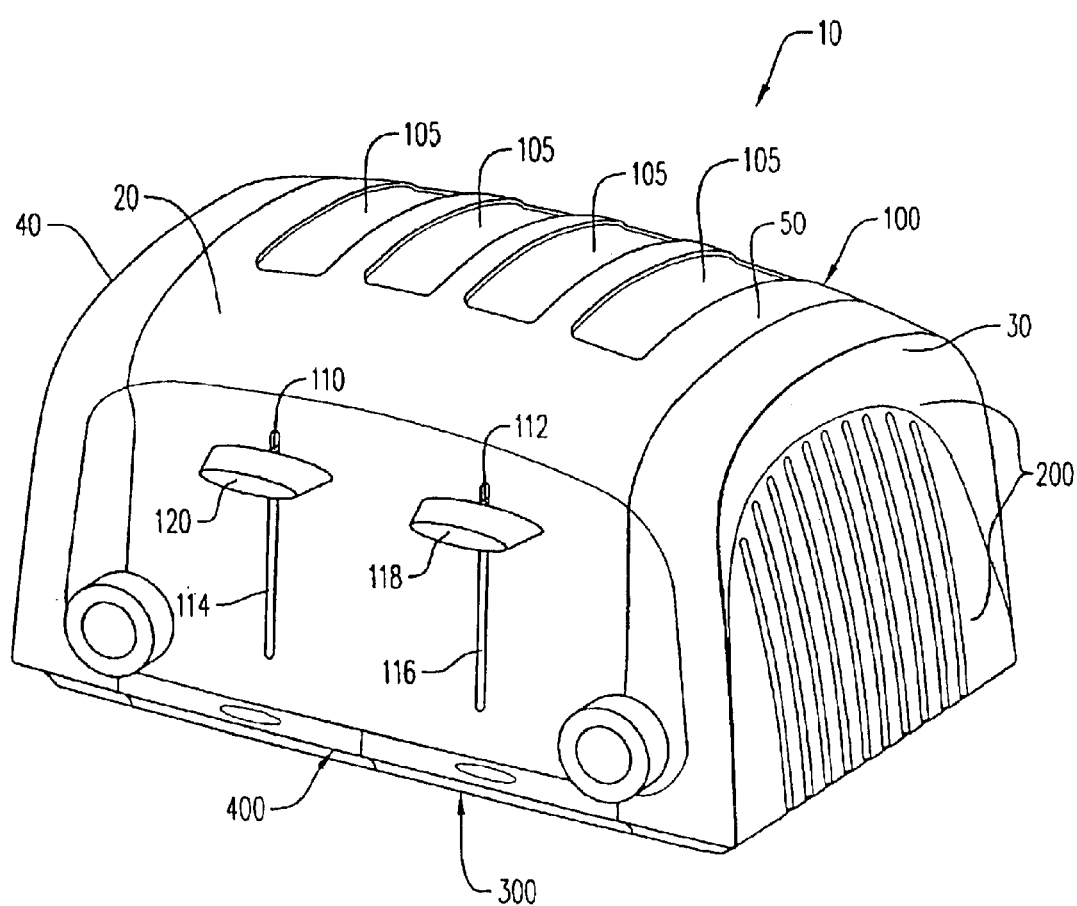
FIG. 1 is a perspective view of a toaster with four bread receiving holes and having a crumb tray assembly according to the present invention.

Referring to the drawings and in particular to FIG. 1, there is provided an electrically operated toaster oven generally represented by reference numeral 10. Toaster oven 10 has an upper body 100, an element assembly center 200 and a lower body 300. The lower body 300 has an exemplary crumb tray assembly 400.

A preferred feature of the present invention is that the crumb tray assembly 400 permits a rapid and easy method of removing breadcrumbs and/or food particles that aggregate therein. The crumb tray assembly 400 allows the user to frequently remove all breadcrumbs from the toaster oven to minimize a potential risk of a fire hazard and a potential risk of pest and rodent infestation.

The toaster oven 10 is shown in an exemplary embodiment as an automatic toaster. However one skilled in the art should appreciate that the toaster oven may be a manual toaster or a semi-automatic toaster oven. As used herein, toaster oven refers to a toaster having a single or multiple bread receiving slots and an oven.

The toaster oven 10 has the upper body 100 with an intermediate portion 20 that is sandwiched by a right support wall 30 and a left support wall 40.

Figure 2:
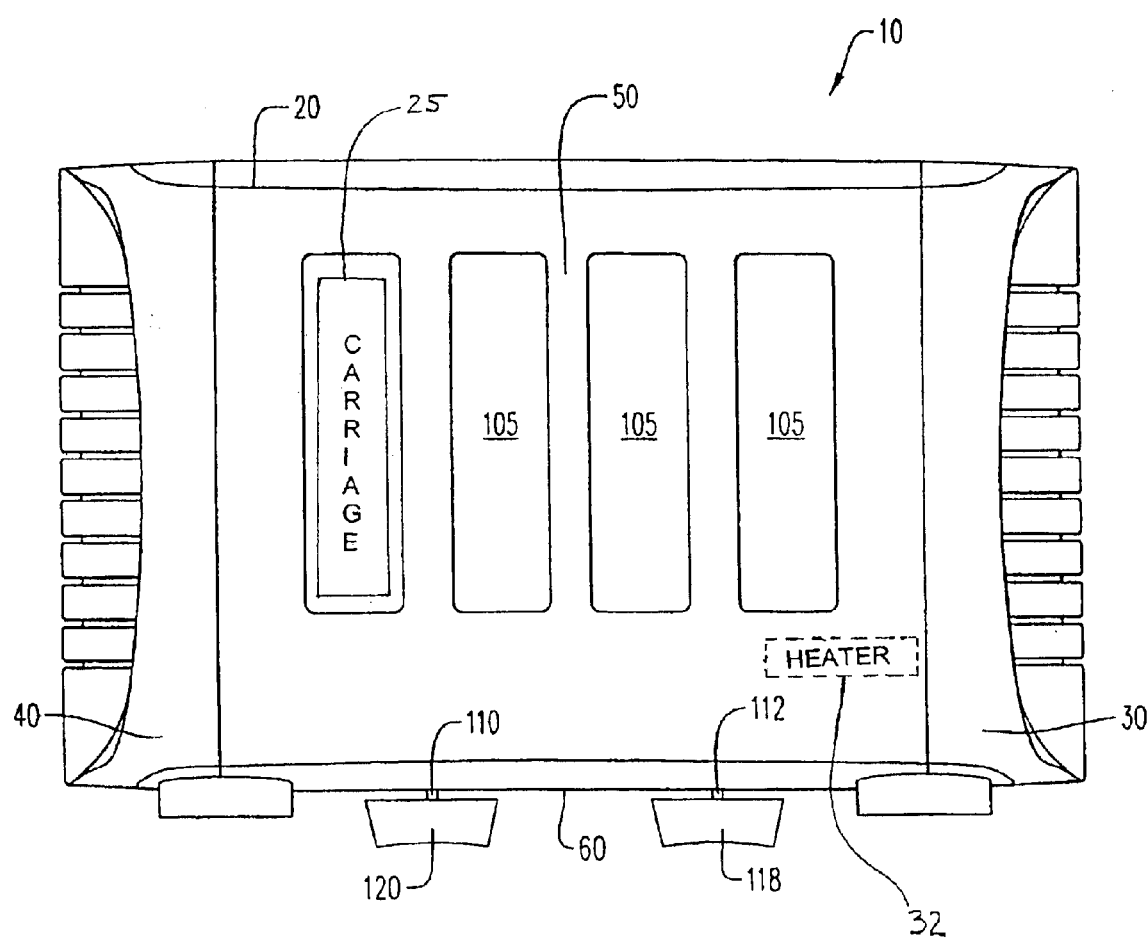
FIG. 2 is a top view of the toaster of FIG. 1.
Figure 3:
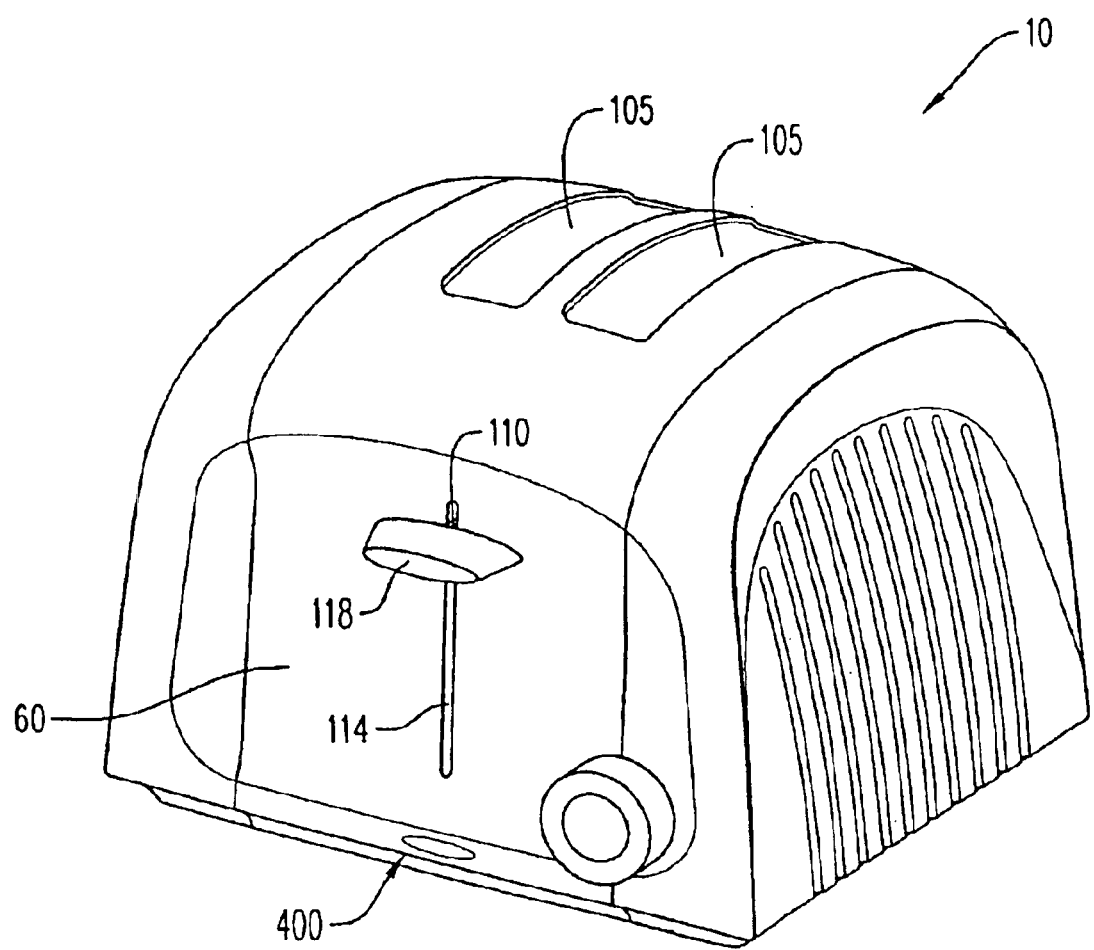
FIG. 3 is a perspective view of a toaster with two bread receiving holes and with the crumb tray assembly of FIG. 1.

Referring to FIG. 2, one or more bread lowering holes 105 are disposed on a top side 50 of the intermediate portion 20. The bread lowering holes 105 may be of a suitable height and suitable length to allow at least one conventional bread slice or at least one conventional waffle to fit therein. The toaster oven 10, although shown as having four bread lowering holes 105, may have any number of bread lowering holes. In another preferred embodiment of the present invention shown as FIG. 3, the toaster has two bread lowering holes.

Figure 4:
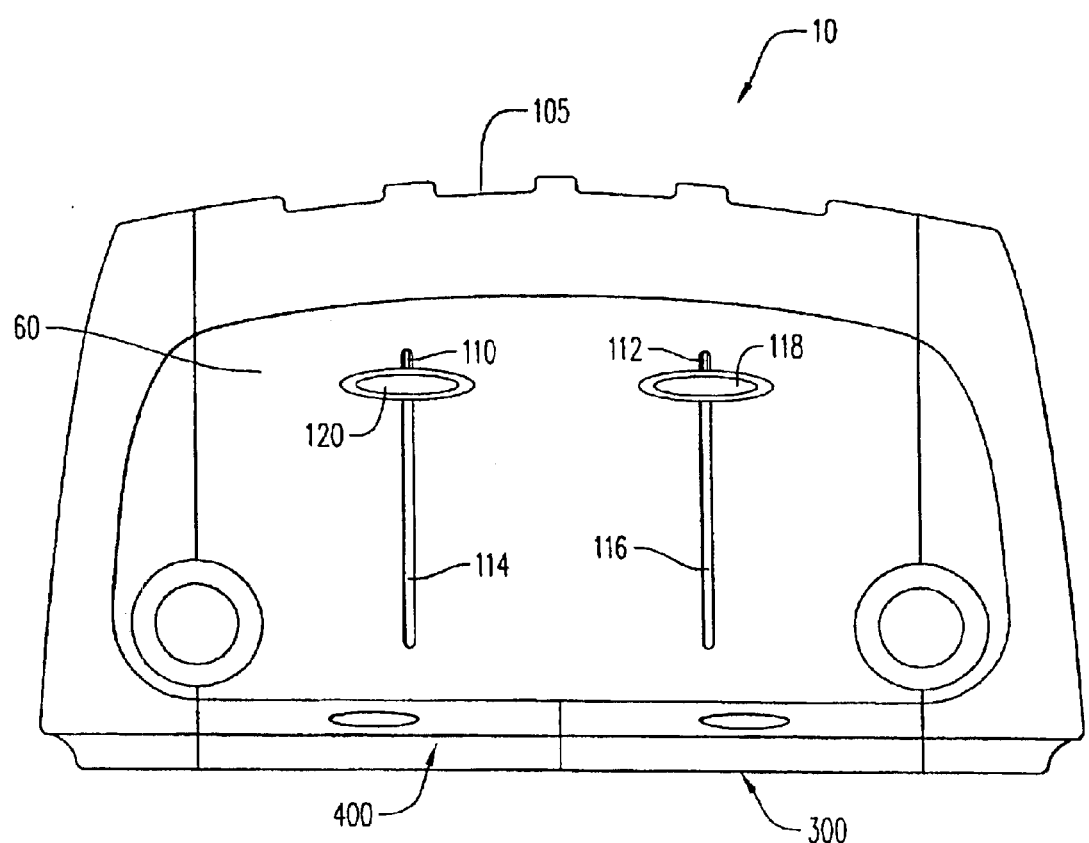
FIG. 4 is a front view of the toaster of FIG. 1.

Referring to FIG. 4, a front side 60 of the toaster oven 10 also has a first operating lever 110 and a second operating lever 112. The first and second operating levers 110, 112 are preferably positioned on the front side 60 of the toaster oven 10 in a first longitudinal slot 114 and a second longitudinal slot 116. Preferably, the first and the second slots 114, 116 are rectangular in shape. The first and the second operating levers 110, 112 each preferably have a bulbous member 118, 120 being disposed thereon. The bulbous members 118, 120 provide a tactile feedback to the user and permit the user to more easily grip the first and the second operating levers 110, 112. This allows a user to easily actuate the first and the second operating members 110, 112 from a first high operating position to a second low operating position.

In the toaster oven 10, the first and second operating levers 110, 112 preferably engage respective first and second bread carriages 25 (one shown in FIG. 2) that are positioned in the bread lowering holes 105. One skilled in the art should appreciate that if the toaster oven 10 is formed as having, for example, four bread lowering holes 105, first, second, third and fourth bread carriages are disposed in each of the bread lowering holes.

A user may commence toasting the bread product by placing the slice of bread in one or more of the bread lowering holes 105. The bread product engages with the first bread carriage 25 in the bread lowering hole 105. Thereafter, the first operating lever 110 is moved from the first high operating position to the second low operating position by traversing the first operating lever along the first slot 114 in a downward fashion. The first operating lever 112 is connected to the first bread carriage to force the first bread carriage to traverse downward into the heating element assembly of the toaster oven 10.

Accordingly, upon moving the first operating lever 110 and the second operating lever 112 the respective first and second bread carriages are lowered into the toaster oven 10 for toasting the bread products.

The heating element assembly of the toaster oven 10 has a heater 32 for toasting bread products therein. The heater is electrically coupled to a power source.

The heater assembly including the heater 32 may be any suitably sized and rated heater suitable for use with the present invention.

In one aspect thereof, the heater 32 is preferably a nickel-chromium heater wire being wound on mica strips. In another embodiment of the present invention, the heater may be one or more nickel-chromium wire coils being disposed around the bread lowering holes 105. In still another embodiment of the present invention, the heater 32 may be an infrared heater, a heater wire or any other heater known in the art.

When the heater 32 is energized with power, the heater generates thermal energy to toast the bread product in the known manner.

The crumb tray assembly 400 is shown in FIG. 4 as being disposed in the lower body 300 of the toaster oven 10 in the aperture 425. The aperture 425 is preferably a rectangular shaped opening in the toaster oven 10. The aperture 425 has a suitable size to permit the caddy 415 to be disposed flush on the front side 60 of the toaster oven 10. One skilled in the art should appreciate that the crumb tray assembly 400 may be placed in any suitable location relative to the location of the bread products that are desired to be toasted, in order to assist in collection of breadcrumbs.

The crumb tray assembly 400 has the caddy 415 being located preferably flush with the front side 60 of the housing such that the crumb tray assembly remains hidden from view and the overall aesthetic appearance of the toaster oven 10 is preserved. The caddy 415 preferably is made from a suitable rigid member. However, one skilled in the art should appreciate that caddy 415 may be formed as a thermoplastic rigid material, a metal material, a wood or any other material known in the art. The caddy 415 is preferably generally "T" shaped and has an outer surface that is preferably complementary to the front side 60 of the toaster oven 10.

Given the repeated loading and the unloading of the pieces of bread product, numerous smaller pieces of bread, food particles or otherwise breadcrumbs can aggregate and fall into the lower body 300 of the toaster oven 10. A known problem in the art is that the user has difficulty disposing of these breadcrumbs in the lower body 300. These breadcrumbs can cause a risk of pest and rodent infestation and potentially are a fire hazard.

Figure 5:
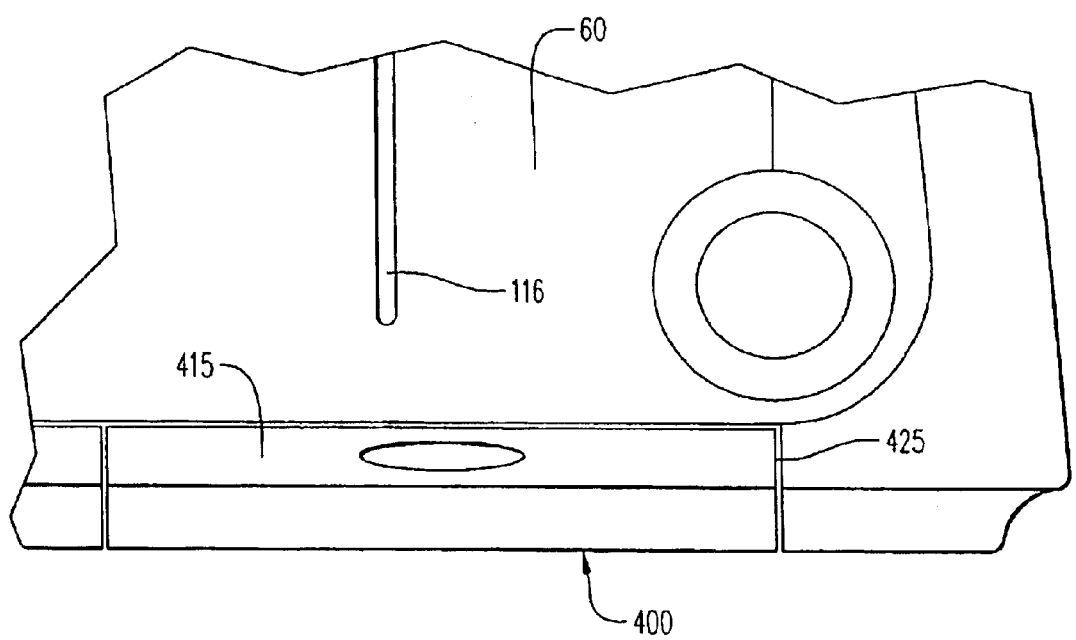
FIG. 5 is an enlarged frontal view of a portion of the toaster of FIG. 3 showing the crumb tray assembly in a first crumb collecting position.
Figure 6:
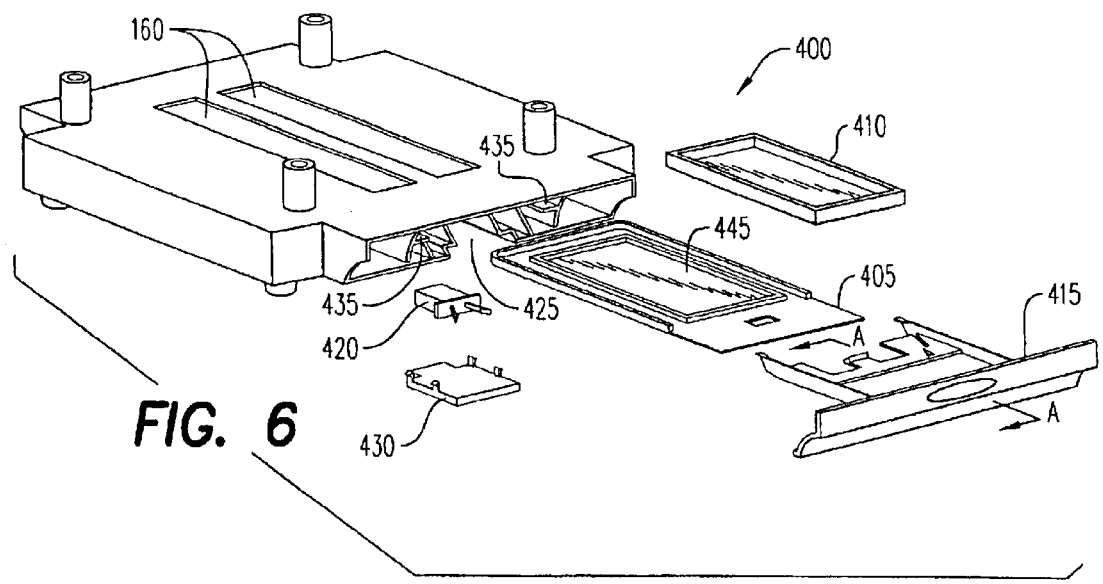
FIG. 6 is an exploded view of the crumb tray assembly of FIG. 1.

Referring to FIGS. 5 and 6, the toaster oven 10 has a crumb tray assembly 400. The crumb tray assembly 400 remedies the above-recited difficulties. The crumb tray assembly 400 has a first tray or element 405, a second tray or element 410, a caddy 415, a biasing device 420, an aperture 425, a bottom cover 430 and a pair of guide rails 435.

In order to better minimize and potentially eliminate the risk of fire and/or pest accumulation, the present invention allows the user to easily and quickly remove any and all breadcrumbs by using the crumb tray assembly 400 without any lifting of the toaster 10.

Figure 7:
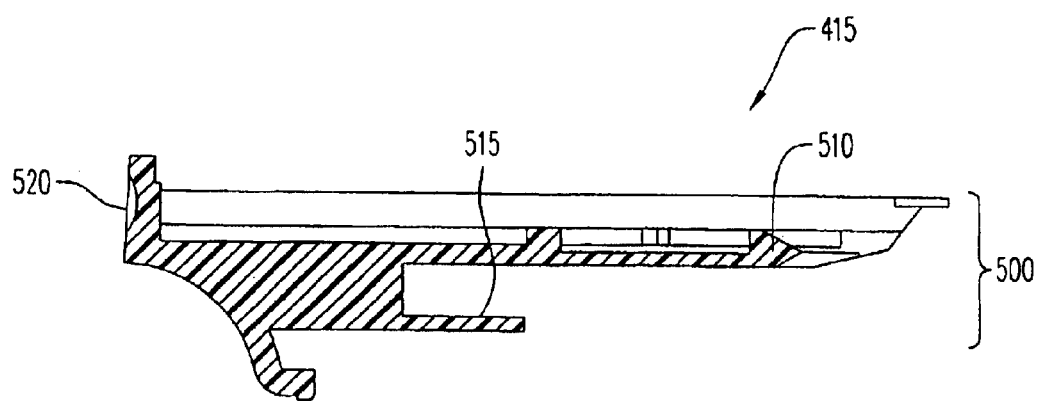
FIG. 7 is a cross sectional side view of a caddy of the crumb tray assembly along line A—A of FIG. 6.
Figure 8:
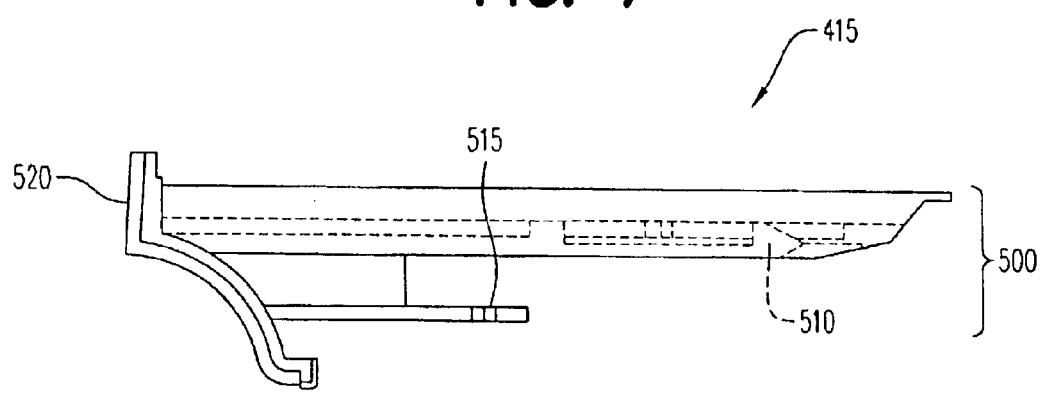
FIG. 8 is a side view of the caddy of the crumb tray assembly of FIG. 6.

Referring to FIGS. 7 and 8, the caddy 415 preferably has an engaging mechanism 500. The engaging mechanism 500 engages the first tray 405 and also the biasing device 420 in the toaster oven 10. The engaging mechanism 500 preferably has a "J" shaped hook 510 and a caddy latch 515. The "J" shaped hook 510 and the caddy latch 515 are both disposed preferably on a rearmost portion of the caddy 415.

Caddy 415 also has a caddy gripping portion 520. The caddy gripping portion 520 allows the user to traverse the caddy 415 inward relative to the front side 60 of the toaster oven 10. The caddy gripping portion 520 also permits traversing the caddy 415 outward away from the front side 60 to remove the crumb tray assembly 400 from the toaster oven 10.

Figure 9:
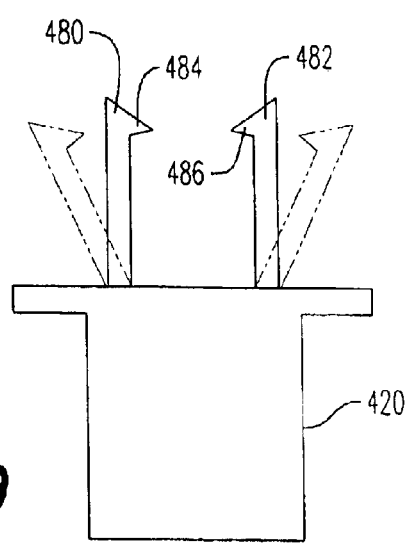
FIG. 9 is a top view of a biasing device of FIG. 6.

Referring to FIG. 9, there is shown the biasing device 420. The biasing device 420 has a first arm 480 and a second arm 482. The first arm 480 has a first notch 484 being disposed thereon. The second arm also has a second notch 486 being disposed on an end thereon. Preferably, the first arm 480 and the second arm 482 will deflect outwardly as is shown by the alternative position shown in FIG. 8. This deflection allows an engaging mechanism 500 to selectively engage/disengage between the first arm 480 and the second arm 482.

Figure 10:
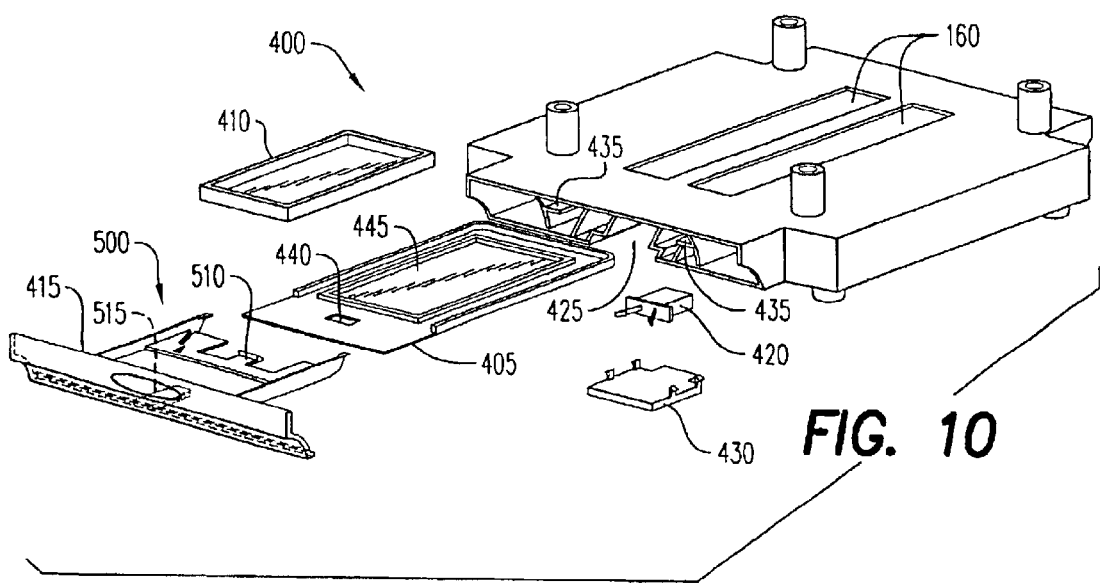
FIG. 10 is another exploded view of the crumb tray assembly of FIG. 1 showing the biasing device.

Referring to FIG. 10, the crumb tray assembly 400 also has the first tray 405 preferably being a shallow, flat, receptacle type member having a raised edge or rim forming one or more side walls. The one or more side walls have a suitable height in order to retain a member being disposed on the first tray 405. In a frontal portion thereof, the first tray 405 has an aperture 440.

The first tray 405 preferably has a trough 445 disposed thereon. The trough 445 is preferably a depression having a volume V that is disposed in the first tray 405. The trough 445 preferably is rectangular in shape. Preferably, the trough 445 has a depth. The depth of the trough 445 is deep to allow a second tray 410 to rest thereon. In another embodiment thereof, the first tray 405 may have one or more feature (not shown) being disposed thereon to hold the second tray 410 on the first tray 405. The feature may be a number of notches or a number of dimples. The notches or dimples retain the second tray 410 to the first tray 405.

The crumb tray assembly 400 also has the biasing device 420 disposed on a bottom side of the aperture 425 of the toaster oven 10. The biasing device 420 preferably is a cam latch mechanism. However, the biasing device 420 may be any other biasing device known in the art, such as for example, a spring, a coil, a spring latch mechanism, a compression spring, an extension spring, and any combinations thereof.

Preferably, the biasing device 420 is positioned to longitudinally extend outward relative to the aperture 425 of the toaster oven 10 to engage the engaging mechanism 500 of the caddy 415.

In this manner, the biasing device 420 selectively engages and disengages the engaging mechanism 500 of the caddy 415. This permits the first tray 405 to move from a first crumb collection position. The first crumb collection position at least retains the first crumb tray 405 in the aperture 425. The biasing device 420 permits the first tray 405 to move to a second crumb removing position that at least partially ejects the first crumb tray beyond the front side 60 of the toaster oven 10.

Figure 11:
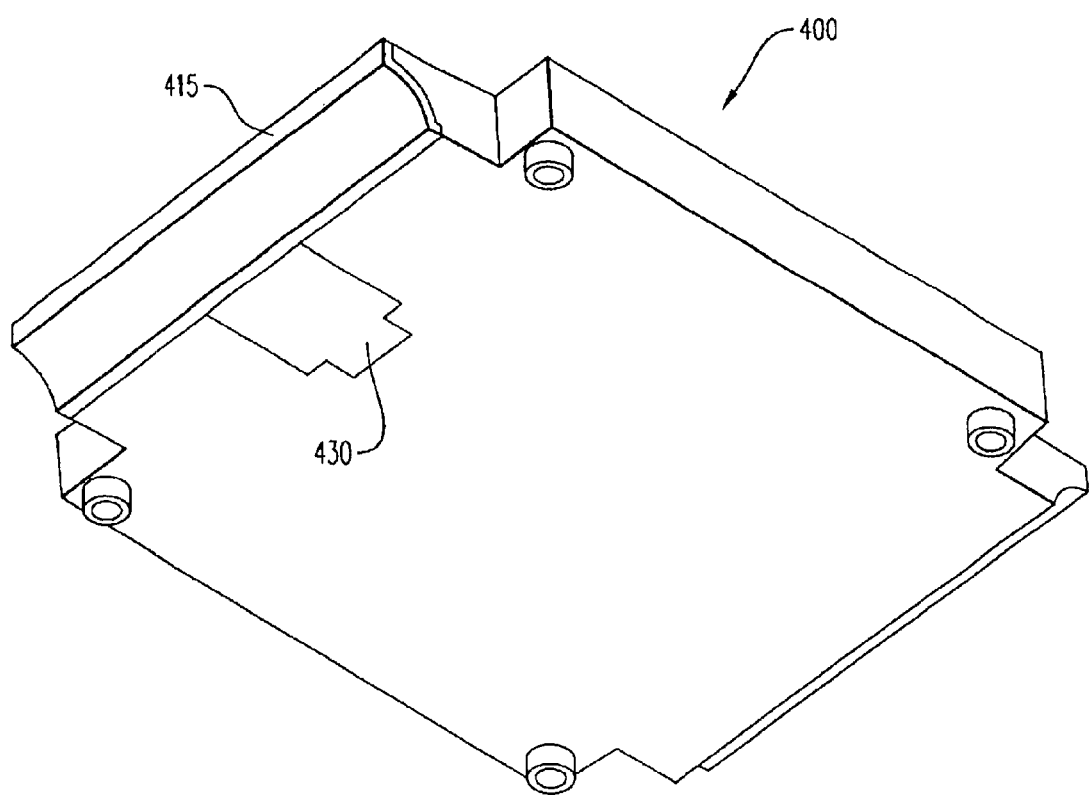
FIG. 11 is a bottom view of the crumb tray assembly in the first crumb collection position of FIG. 10.
Figure 12:
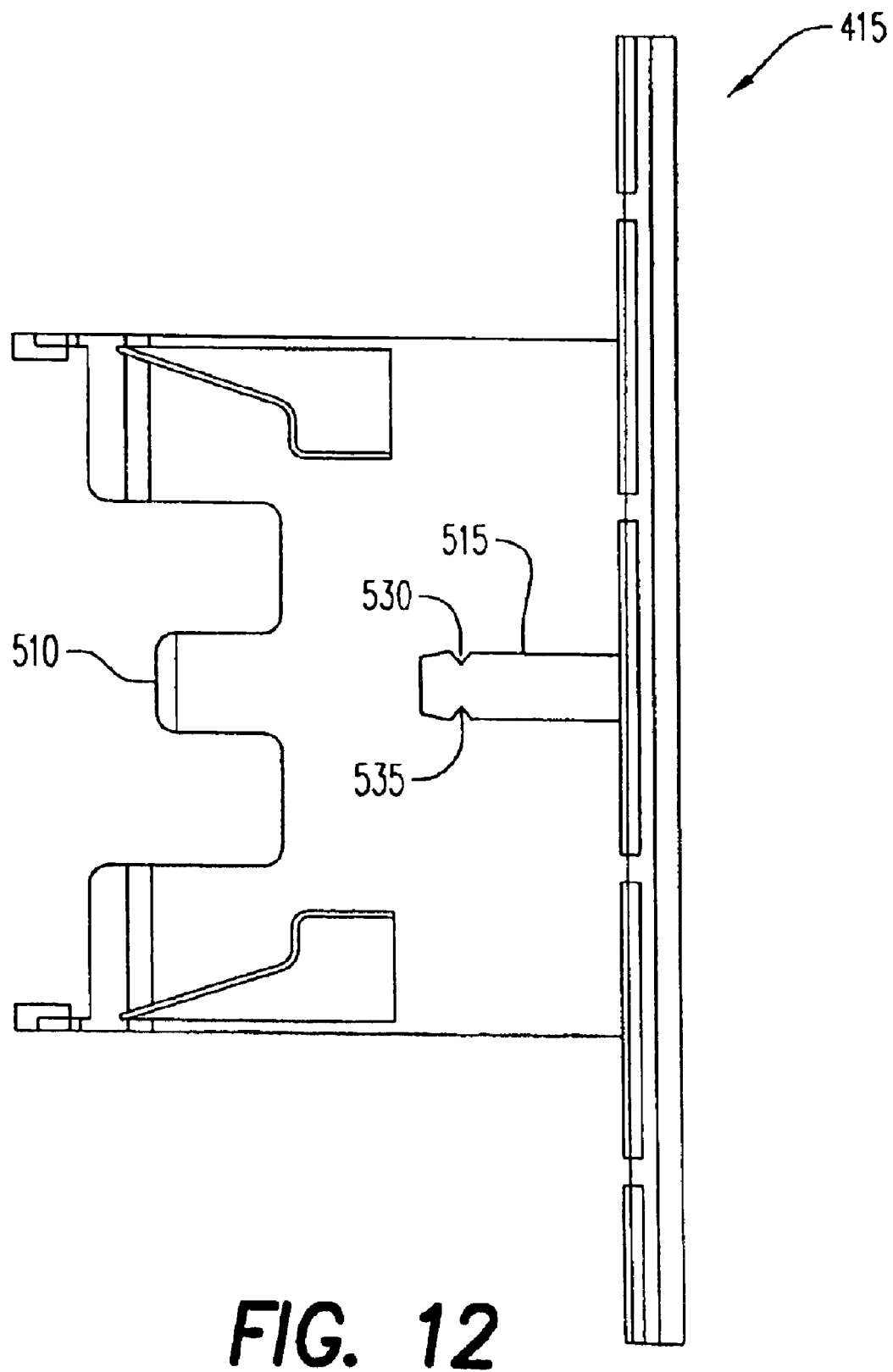
FIG. 12 is a bottom view of a caddy of the crumb tray assembly with a caddy latch and a "J" shaped hook.

Referring to FIGS. 10, 11 and 12, in operation when a user desires to remove the breadcrumbs from the toaster oven 10, the user pulls the caddy 415 away from the front side 60 of the toaster oven 10 shown in FIG. 10. The "J" shaped hook 510 of caddy 415 hooks into the aperture 440 on the first tray 405. In this manner, when the caddy 415 traverses in a forward or in a rearward manner, the first tray 405 that rides on the pair of guide rails 435 also traverses forward or rearward in and out of the aperture 425.

When the caddy 415 is positioned toward the front side 60, the caddy latch 515 will engage on the biasing device 420. As shown in FIG. 12, the caddy latch 515 may have first and second notches 530, 535 in the opposite lateral sides of the caddy latch 515. The biasing device 420 may also have a respective male member being disposed thereon. The respective male member may be fitted into the respective first and second notches 530, 535 to retain the biasing device 420 to the caddy latch 515. In this manner, the caddy latch 515 is selectively retained on the biasing device 420.

Another exemplary feature of the present invention is that the caddy 415 can be selectively disengaged from the toaster oven 10. Upon traversing the caddy 415 slightly inward toward the front side 60 of the toaster oven 10, the caddy latch 515 will disengage from the biasing device 420, thereby freeing the caddy 415.

Although, the caddy 415 is selectively engaged or disengaged from the biasing device 420, the first tray 405 is preferably fixedly connected to the caddy. This allows the user to pull the first tray 405 from the aperture 425. Referring to FIG. 9, when the caddy 415 is traversed opposite the toaster oven 10, the "J" shaped hook 510 will remain engaged to aperture 440. This allows the first tray 405 to move in the same direction with the caddy 415. Once the caddy latch 415 is disengaged from the biasing device 420, the user can pull the caddy 415 away from the toaster oven 10 and expose the first tray 405 to the exterior of the toaster oven 10.

Figure 13:
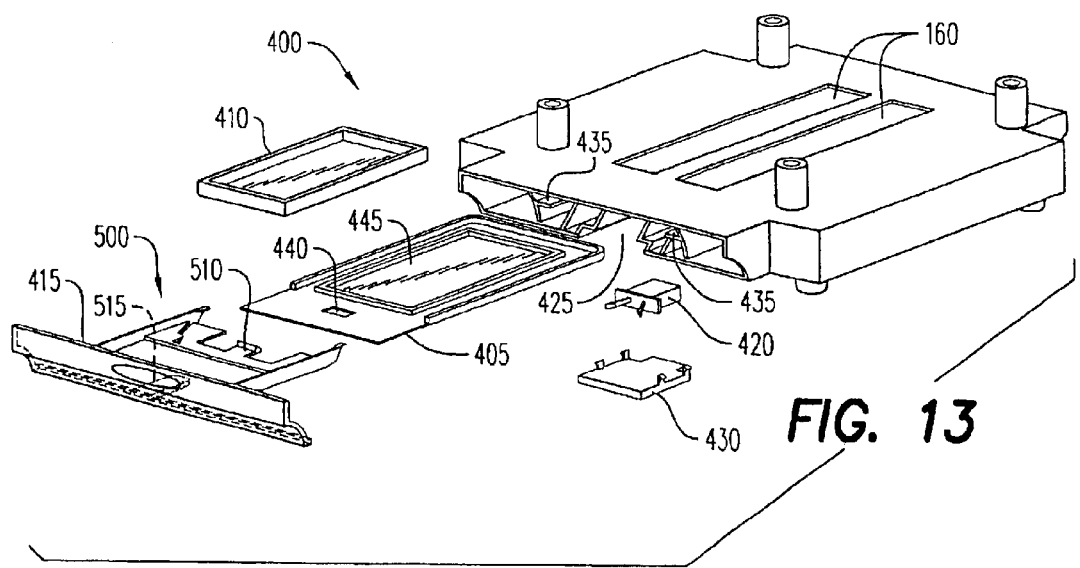
FIG. 13 is yet another exploded view of the crumb tray assembly of FIG. 1 showing the biasing device being connected to the toaster oven.

Referring to FIG. 13, when the caddy 415 is in the aperture 425, the first tray 405 is preferably positioned in the toaster oven 10 underneath a number of slots 160 under the first and second bread carriages. The slots 160 are suitable, sized, preferably rectangular, apertures that are suitable to allow breadcrumbs and/or food particles to fall through the slots 160 onto the first tray 405 and the second tray 410. In this manner, the toaster oven 10 is formed to allow the first tray 405 and the second tray 410 to be disposed under the slots 160 to allow the breadcrumbs to aggregate thereon for later removal.

Trough 445 is preferably a shallow receptacle being on the first tray 405 for holding breadcrumbs or the second tray 410. In another exemplary embodiment of the present invention, the first tray 405 is formed with the trough 445 preferably having a configuration in order for the second tray 410 to rest thereon.

Preferably, the second tray 410 preferably is a shallow, flat receptacle with a raised edge or rim, used for carrying or holding breadcrumbs thereon. The second tray 410 may be made of a thermoplastic, a metal, a wood or any other suitable rigid material. The second tray 410 may have a coating thereon that increases friction. Alternatively, the second tray 410 may have a number of notches (not shown) being disposed thereon. In this manner, the breadcrumbs that aggregate thereon are not jettisoned from the second tray 410 when the caddy 415 and the first tray 405 are moved forward or rearward.

The aperture 425 has the pair of guide rails 435. The pair of guide rails 435 preferably is disposed on lateral sides of the aperture 425. The pair of guide rails 435 preferably is rectangular and is suitably rigid to support the first tray 405 thereon. The pair of guide rails 435 allow the user to lead or direct the first tray 405 into the first crumb collection position and to the second crumb removing position.

In another alternative embodiment, the second tray 410 may further have a handle (not shown). The handle may be disposed on or integral with the second tray 410 and have a gripping portion being disposed thereon. The handle assists with lifting the second tray 410 out of the trough 445 and ejecting breadcrumbs and replacing the second tray into the trough 445.

The toaster oven 10 may be powered by a line source (e.g. a 120-volt AC source) or a battery (not shown). In another alternative preferred embodiment, the crumb tray assembly 400 may further have a transmission, an actuator having a first position and a second position and a motor. The actuator preferably is a button being placed on the toaster oven 10 or a remote control unit (not shown). The motor is electrically coupled to the power source (not shown).

In response to the actuator being actuated from the first position to the second position, the motor drives the transmission. The transmission preferably moves the first tray from the first crumb collecting position to the second crumb removing position. Upon a second actuation the motor drives the transmission, in response thereto, in reverse to return the first tray from the second crumb removing position to the first crumb collecting position.

It should be understood that the foregoing description is only illustrative of the present invention. Various alternatives and modifications can be devised by those skilled in the art without departing from the invention. Accordingly, the present invention is intended to embrace all such alternatives, modifications and variances.

What is claimed is:

1. A toaster for toasting food comprising:
   a housing having one or more bread receiving holes and an aperture;
   a bread carriage being positioned in each of said one or more bread receiving holes;
   a first tray being positionable in said aperture, wherein said first tray has a first crumb collecting position and a second crumb removing position; and
   a second removable tray being disposed on said first tray for movement therewith.

2. The toaster of claim 1, wherein said first tray has a trough, and wherein said second removable tray is disposed in or on said trough of said first tray.

3. The toaster of claim 2, wherein said first tray has a device for biasing said first tray to selectively actuate said first tray from said first crumb collecting position to said second crumb removing position.

4. The toaster of claim 3, further comprising a detent for securing said first tray in said first crumb collecting position in said housing.

5. The toaster of claim 3, wherein said biasing device is a cam latch having an engaging member that selectively engages said cam latch for selectively manipulating said first tray from said first crumb collecting position to said second crumb removing position.

6. The toaster of claim 4, wherein said detent selectively fastens said first tray in said aperture of said housing in said first crumb collecting position.

7. The toaster of claim 3, wherein said first tray has a caddy for allowing selective manipulation of said first tray from said first crumb collecting position to said second crumb removing position.

8. The toaster of claim 7, wherein said caddy has a hand grip for selectively moving said caddy and engaging said biasing device.

9. A toaster for toasting food comprising:
   a housing having one or more bread receiving holes and an aperture;
   a bread carriage being positioned in each of said one or more bread receiving holes;
   a first tray being positionable in said aperture, wherein said first tray has a first crumb collecting position and a second crumb removing position; and
   a caddy that has a hook disposed on an end of said caddy, wherein said first tray has a tray aperture, and wherein said hook engages said tray aperture for allowing said caddy to move said first tray to said second crumb removing position.

10. A toaster for toasting food comprising:
    a housing having one or more bread receiving holes and an aperture;
    a bread carriage being positioned in each of said one or more bread receiving holes;
    a first tray being positionable in said aperture, wherein said first tray has a first crumb collecting position and a second crumb removing position; and
    a transmission and a motor being operable to drive said transmission to move said first tray from said first crumb collecting position to said second crumb removing position.

11. The toaster of claim 10, wherein said motor is operable to drive said transmission to move said first tray from said second crumb removing position to said first crumb collecting position.

12. The toaster oven for toasting bread comprising
    a housing having an aperture with a plurality of guide rails;
    a heater;
    a first tray being supported on said plurality of guide rails, said first tray having a caddy with a latch, said first tray having a trough being disposed therein, said trough having a sidewall and a base;
    a second removable tray having a receptacle and a rim adjacent to said sidewall for selectively positioning said second tray in said trough; and
    a biasing device for selectively engaging said latch to move said first tray to a first crumb collecting position when said first tray is manipulated to a first position and said biasing device disengages said latch to permit said first tray to move to a second crumb removing position when said first tray is manipulated to a second position.

13. The toaster oven of claim 12, wherein said second removable tray has a feature selected from the group consisting of a handle, a coating, a number of dimples, a notch, a second trough, a number of depressions, and any combinations thereof.

14. The toaster oven of claim 12, wherein said heater is a heater wire.

15. The toaster oven of claim 12, wherein said biasing device is selected from the group consisting of a latch, a spring, a coil, a motor, and any combinations thereof.

16. The toaster oven of claim 15, wherein said biasing device is adjacent said aperture.

17. The toaster oven of claim 15, wherein said caddy is substantially "T" shaped, and wherein said caddy has a gripping portion disposed on an exterior thereof.

18. The toaster oven of claim 15, said first tray is disposed under a bread carriage in said first crumb collection position and said first tray is external to the toaster oven in said second crumb removing position.

19. The toaster oven of claim 15, wherein said trough has a detent for selectively fastening said second removable tray to said first tray.

20. The toaster oven for toasting bread comprising:
    a housing having a rectangular shaped aperture on a lower portion of the toaster oven, said rectangular shaped aperture having a plurality of guide rails on a lateral side of said aperture;
    a heater wire being disposed in the toaster surrounding a bread lowering hole;

a first tray being guided by said plurality of guide rails, said first tray having a "T" shaped caddy with a member, said member having one or more notches, said first tray having a trough disposed thereon, said trough having a sidewall and a base;

a removable second tray having a receptacle and a rim, said rim being adjacent to said sidewall for selectively holding said rectangular second tray in said trough; and a latch adapted to engage a biasing device to allow said first tray to move to a first crumb collecting position when said first tray is manipulated to a first position and adapted to disengage said biasing device to allow said first tray to move to a second crumb removing position when said first tray is manipulated to a second position.

* * * * *